(12) United States Patent
Romano, IV et al.

(10) Patent No.: US 9,964,880 B1
(45) Date of Patent: May 8, 2018

(54) PHASE INVERSION EMULSIFICATION PROCESS FOR CONTROLLING LATEX PARTICLE SIZE

(71) Applicant: Xerox Corporation, Norwalk, CT (US)

(72) Inventors: Andrew A. Romano, IV, Irondequoit, NY (US); Shigeng Li, Penfield, NY (US); Michael J. Miller, Rochester, NY (US); Jay L. Schneider, Canandaigua, NY (US)

(73) Assignee: Xerox Corporation, Norwalk, CT (US)

( * ) Notice: Subject to any disclaimer, the term of this patent is extended or adjusted under 35 U.S.C. 154(b) by 0 days. days.

(21) Appl. No.: 15/466,351

(22) Filed: Mar. 22, 2017

(51) Int. Cl.
| | |
|---|---|
| *G03G 9/00* | (2006.01) |
| *G03G 9/087* | (2006.01) |
| *C08J 3/14* | (2006.01) |
| *C08J 3/11* | (2006.01) |
| *G03G 9/08* | (2006.01) |
| *B01J 13/12* | (2006.01) |

(52) U.S. Cl.
CPC ........ *G03G 9/08755* (2013.01); *B01J 13/125* (2013.01); *C08J 3/11* (2013.01); *C08J 3/14* (2013.01); *G03G 9/081* (2013.01); *G03G 9/0804* (2013.01); *G03G 9/0819* (2013.01); *C08J 2367/03* (2013.01)

(58) Field of Classification Search
CPC .... G03G 9/0804; G03G 9/0819; G03G 9/081; B01J 13/125; B01J 3/11; B01J 3/15
USPC ........................................ 430/137.14, 137.15
See application file for complete search history.

(56) References Cited

U.S. PATENT DOCUMENTS

| | | |
|---|---|---|
| 4,298,672 A | 11/1981 | Lu |
| 4,338,390 A | 7/1982 | Lu |
| 4,935,326 A | 6/1990 | Creatura et al. |
| 4,937,166 A | 6/1990 | Creatura et al. |
| 5,290,654 A | 3/1994 | Sacripante et al. |
| 5,302,486 A | 4/1994 | Patel et al. |
| 6,593,049 B1 | 7/2003 | Veregin et al. |

(Continued)

*Primary Examiner* — Mark A Chapman
(74) *Attorney, Agent, or Firm* — Marylou J. Lavoie, Esq. LLC

(57) ABSTRACT

A phase inversion emulsification process for controlling latex particle size including a) combining a resin, an organic solvent, an optional neutralizing agent, and a first portion of water in a reactor; wherein said reactor is equipped with a jacket, a vacuum, a condenser connected to the reactor by a distillate conduit, and a receiver connected to the condenser by a condensate conduit, to form a water-in-oil dispersion mixture; b) adding a second portion of water to the reactor to convert the water-in-oil dispersion mixture into an oil-in-water dispersion comprising a latex emulsion of latex particles; c) forming a distillate and controlling the distillate temperature by at least one of: adjusting the jacket temperature, adjusting the vacuum level, or a combination thereof; wherein controlling the distillate temperature controls a particle size distribution change of the latex particles during solvent removal; wherein the distillate temperature is from about 30 to about 80° C.; d) performing solvent removal wherein volatile organic compounds are pulled out of the liquid phase in the reactor to a vapor phase and transferred to the condenser via the distillate conduit; e) cooling distillate vapor in the condenser to a liquid phase; and f) collecting the liquid condensate in the receiver.

20 Claims, 2 Drawing Sheets

(56) References Cited

U.S. PATENT DOCUMENTS

| | | |
|---|---|---|
| 6,756,176 B2 | 6/2004 | Stegamat et al. |
| 6,830,860 B2 | 12/2004 | Sacripante et al. |
| 7,713,674 B2 | 5/2010 | Chen et al. |
| 8,916,320 B2 | 12/2014 | Qiu et al. |
| 9,348,248 B2 | 5/2016 | Qiu et al. |
| 9,354,531 B2 | 5/2016 | Li et al. |
| 9,366,980 B2 | 6/2016 | Li et al. |
| 9,410,037 B2 | 8/2016 | Li et al. |
| 2015/0168858 A1 | 6/2015 | Li et al. |
| 2016/0160046 A1* | 6/2016 | Li .................. G03G 9/08755 430/109.4 |

* cited by examiner

PHASE INVERSION EMULSIFICATION PROCESS FOR CONTROLLING LATEX PARTICLE SIZE

BACKGROUND

Disclosed herein is a phase inversion emulsification process for controlling latex particle size. More particularly disclosed is a phase inversion emulsification process comprising: a) combining a resin, an organic solvent, an optional neutralizing agent, and a first portion of water in a reactor; wherein said reactor is equipped with a jacket, a vacuum, a condenser connected to the reactor by a distillate conduit, and a receiver connected to the condenser by a condensate conduit, to form a water-in-oil dispersion mixture; b) adding a second portion of water to the reactor to convert the water-in-oil dispersion mixture into an oil-in-water dispersion comprising a latex emulsion of latex particles; c) forming a distillate and controlling the distillate temperature by at least one of: adjusting the jacket temperature, adjusting the vacuum level, or a combination thereof; wherein controlling the distillate temperature controls the particle size change or particle size distribution shift of the latex particles; d) wherein volatile organic compounds are pulled out of the liquid phase in the reactor to a vapor phase and transferred to the condenser via the distillate conduit; e) cooling distillate vapor in the condenser to a liquid phase; and f) collecting the liquid condensate in the receiver.

Phase inversion emulsification (PIE) processes are known. See for example, U. S. Patent Application Publication 2015/0168858, which is hereby incorporated by reference herein in its entirety. U. S. Patent Application Publication 2015/0168858 describes in the Abstract thereof a process for making a latex emulsion suitable for use in a toner composition which applies the model of Brinkman to predict phase inversion point (PIP) during phase inversion emulsification including using this model to calculate the amount of water needed to complete the phase inversion for solvent reuse formulation.

U.S. Pat. No. 9,366,980, which is hereby incorporated by reference herein in its entirety, describes in the Abstract thereof a process for making colored polyester latex by phase inversion emulsification.

U.S. Pat. No. 8,916,320, which is hereby incorporated by reference herein in its entirety, describes in the Abstract thereof a process for making a latex emulsion including contacting at least one amorphous resin with at least two organic solvents to form a resin mixture, adding a neutralizing agent and deionized water to the resin mixture, removing the solvent from the formed latex, and separating the solvent from water. Further, the process is carried out above the resin Tg for making the latex, which drives the latex particle size under 100 nm, where toners made from the latex show improved charging performance. See also U.S. Pat. No. 9,348,248, which is hereby incorporated by reference herein in its entirety.

U.S. Pat. No. 7,713,674, which is hereby incorporated by reference herein in its entirety, describes in the Abstract thereof an emulsion polymerization process comprising polymerizing monomer in an emulsion in a reaction vessel at a first temperature to form a resin; cooling the reaction vessel to a second temperature that is above the softening point of the resin yet below the temperature required for significant depolymerization reaction to occur; and adding water to the cooled reaction vessel in an amount sufficient to effect phase inversion with mixing for a sufficient time to form an aqueous latex emulsion in the absence of a surfactant.

U.S. Pat. No. 9,410,037, which is hereby incorporated by reference herein in its entirety, describes in the Abstract thereof a process for making a crystalline latex suitable for use in a toner by phase inversion emulsification (PIE) where the liquid reagents, such as, organic solvent(s), neutralizing agent and water, are reused from a prior PIE.

U.S. Pat. No. 9,354,531, which is hereby incorporated by reference herein in its entirety, describes in the Abstract thereof a process for making a latex emulsion where distillation occurs at an elevated temperature is used to make resin particles with a conditioned surface which can be used to make magenta toner with increased efficiency.

Latex emulsions of resins may be produced using PIE processes in which resins are dissolved in a mixture of water, a base and organic solvent(s) (e.g., methyl ethyl ketone (MEK), isopropyl alcohol (IPA) or both) to form a water-in-oil (W/O) dispersion (i.e., water droplets dispersed in continuous oil). Subsequently, water is added to convert the dispersion into an oil-in-water (O/W) dispersion. In embodiments, liquids from a prior PIE can be reused in a subsequent PIE.

As described above, phase inversion emulsification (PIE) processes for making resin latex from a resin use solvents such as methyl ethyl ketone (MEK) and isopropyl alcohol (IPA) to dissolve the resin. After conversion, the volatile organic compounds (VOCs) need to be removed from the latex in order to meet environmental regulations for use as a raw material in both the emulsion aggregation (EA) process and the toner end product. The current method of solvent removal is vacuum distillation of the latex.

In order for the latex to be a useful raw material in the EA process, the particle size distribution needs to be in a specified range. The PIE formulation is always pre-tested and modified in lab to adjust latex particle size to desired specifications due to lot-to-lot variation of resin properties. This is the only way for particle size control in current latex production. However, this formulation adjustment only ensures the particle size after phase inversion. Particle size variability can still be observed due to solvent stripping. In particular, as the VOCs are removed from the emulsion, the size of the particles shrinks, often leading to variability and risk of producing particle out of specifications. Currently, the method to predict the degree of shrinkage is to take the latex sample before distillation and mix it with 50° C. water. By adding the latex to the higher temperature water, the particle will show similar behavior of shrinking that is seen during distillation but it does not always reflect the final particle size after distillation. This comparison is then used to modify the PIE formulation to give a desired final result. However, it is not a direct comparison and the shrinking that is seen during distillation is not always consistent making this method unreliable.

As described above, the current method to predict the degree of shrinkage of distilled latex particle is to add the latex sample to 50° C. water and then measure the particle size distribution. The 50° C. water facilitates the evaporation of solvents from the latex particle, simulating the shrinking process in latex distillation. This method allows for an estimation of the change of particle size after stripping. However, it does not provide a method for size control of the distilled latex. Further, the simulated particle does not always reflect the actual final particle after distillation.

Currently available latex processes are suitable for their intended purposes. However a need remains for improved latex processes. Further, a need remains for a reliable method to control the latex particle size shift so that a higher quality of latex can be produced, in embodiments for toner EA processes.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a phase inversion emulsification process for controlling latex particle size comprising: a) combining a resin, an organic solvent, an optional neutralizing agent, and a first portion of water in a reactor; wherein said reactor is equipped with a jacket, a vacuum, a condenser connected to the reactor by a distillate conduit, and a receiver connected to the condenser by a condensate conduit, to form a water-in-oil dispersion mixture; b) adding a second portion of water to the reactor to convert the water-in-oil dispersion mixture into an oil-in-water dispersion comprising a latex emulsion of latex particles; c) forming a distillate and controlling the distillate temperature by at least one of: adjusting the jacket temperature, adjusting the vacuum level, or a combination thereof; wherein controlling the distillate temperature controls a particle size distribution change of the latex particles during solvent removal; wherein the distillate temperature is from about 30 to about 80° C.; d) performing solvent removal wherein volatile organic compounds are pulled out of the liquid phase in the reactor to a vapor phase and transferred to the condenser via the distillate conduit; e) cooling distillate vapor in the condenser to a liquid phase; and f) collecting the liquid condensate in the receiver.

Also described is a toner process comprising: a) combining a first resin, an organic solvent, an optional neutralizing agent, and a first portion of water in a reactor; wherein said reactor is equipped with a jacket, a vacuum, a condenser connected to the reactor by a distillate conduit, and a receiver connected to the condenser by a condensate conduit, to form a water-in-oil dispersion mixture; b) adding a second portion of water to the reactor to convert the water-in-oil dispersion mixture into an oil-in-water dispersion comprising a latex emulsion of latex particles; c) forming a distillate and controlling the distillate temperature by at least one of: adjusting the jacket temperature, adjusting the vacuum level, or a combination thereof; wherein controlling the distillate temperature controls a particle size distribution change of the latex particles during solvent removal; wherein the distillate temperature is from about 30 to about 80° C.; d) wherein volatile organic compounds are pulled out of the liquid phase in the reactor to a vapor phase and transferred to the condenser via the distillate conduit; e) cooling distillate vapor in the condenser to a liquid phase; f) collecting the liquid condensate in the receiver; g) optionally, adding a second resin to the latex emulsion obtained in step b); h) optionally, adding a crystalline resin to the latex emulsion obtained in step b); i) optionally, adding a wax, a colorant, or a combination thereof to the latex emulsion obtained in step b); j) optionally, adding a flocculent to the late emulsion obtained in step b); k) aggregating particles in said latex emulsion; l) freezing particle growth in said emulsion to form parent particles; m) optionally, adding a shell resin to form core-shell particles; o) optionally, coalescing the parent particles or the core-shell particles to form toner particles; and p) optionally, collecting the parent particles of l), the core-shell particles of m) or the toner particles of o).

DETAILED DESCRIPTION

A method for controlling the shrinking behavior of latex particles that is associated with removal of the volatile organic compounds (VOCs) from resin latex is described. By adjusting the vacuum level and jacket temperature of the reactor, the temperature of the distillate before it enters the condenser can be controlled. While not wishing to be bound by theory, it was found that there is strong correlation between the degree of the latex particle size shift and distillate temperature—the change in particle size before and after VOC removal is proportional to the temperature of the distillate. Thus, controlling the distillate temperature controls the particle size distribution shift. By adjusting the shrinking degree of the particle size through selection of distillate temperature, the final particle size distribution of the resin latex can be controlled and optimized during stripping.

Figure 1:
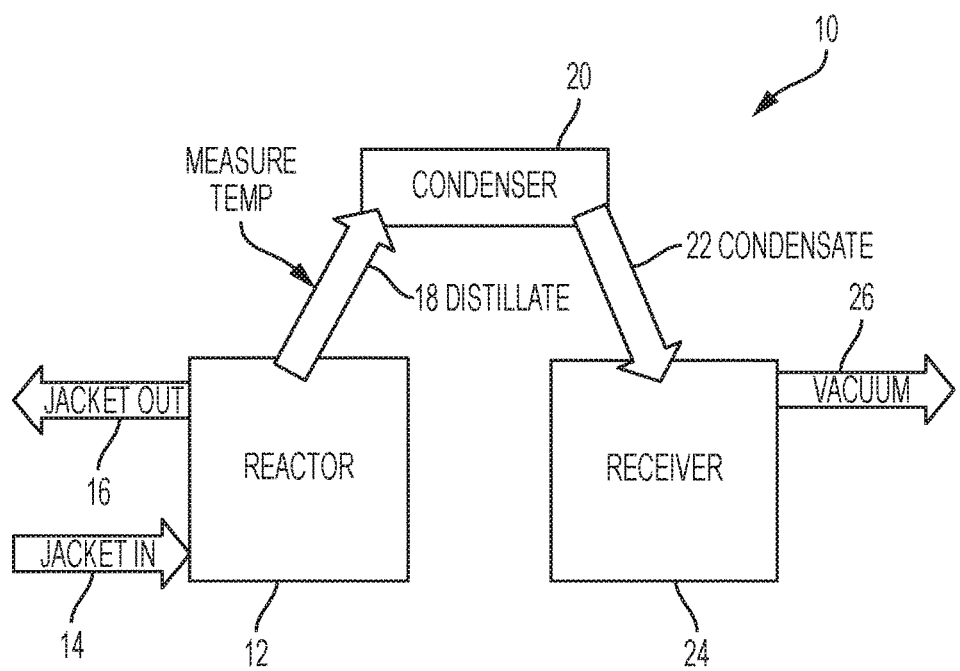
FIG. 1 is a process flow diagram for the phase immersion emulsification process in accordance with the present embodiments.

Turning to FIG. 1, a phase inversion emulsification (PIE) process flow diagram including system 10 for the PIE process to make latex is shown. Components of the system/process 10 include a reactor 12 having a jacket in 14 and jacket out 16. Distillate arm 18 is fitted with a temperature measuring device (not shown) and is connected to condenser 20. Condensate arm 22 feeds condensate to receiver 24. Vacuum device 26 is provided at receiver 24. After the desired resin is dissolved in the reactor 12 and converted to latex, the solvents, such as methyl ethyl ketone (MEK) and isopropyl alcohol (IPA) need to be removed. First, the jacket 14 is heated and then vacuum 26 is pulled on the entire system 10 through the receiver 24. The VOCs are pulled out of the liquid phase in the reactor 12 to the vapor phase and move to the condenser 20. The distillate temperature right before entering the condenser is measured such as in distillate arm 18. The distillate vapor is then cooled in the condenser 20 and returns to the liquid phase, collecting in the receiver 24. In embodiments, there are two parameters that can be used to control the distillate temperature, the set point of jacket 14 temperature and the set point of vacuum 26 level. By manipulating these variables the distillate temperature can be controlled.

In embodiments, a phase inversion emulsification process herein comprises: a) combining a resin, an organic solvent, an optional neutralizing agent, and a first portion of water in a reactor; wherein said reactor is equipped with a jacket, a vacuum, a condenser connected to the reactor by a distillate conduit, and a receiver connected to the condenser by a condensate conduit, to form a water-in-oil dispersion mixture; b) adding a second portion of water to the reactor to convert the water-in-oil dispersion mixture into an oil-in-water dispersion comprising a latex emulsion of latex particles; c) forming a distillate and controlling the distillate temperature by at least one of: adjusting the jacket temperature, adjusting the vacuum level, or a combination thereof; wherein controlling the distillate temperature controls a particle size distribution shift, or particle size change, of the latex particles; d) wherein volatile organic compounds are pulled out of the liquid phase in the reactor to a vapor phase and transferred to the condenser via the distillate conduit; e) cooling distillate vapor in the condenser to a liquid phase; and f) collecting the liquid condensate in the receiver. In embodiments, the present disclosure includes a latex emulsion prepared with the process described herein. Thus, controlling the distillate temperature controls a particle size change of the latex particles.

The particle size distribution of the latex particles in the latex emulsion is changed during the solvent removal process. In embodiments, the magnitude of the change can be controlled through the control of the temperature of the distillate, the vacuum applied to the system, or a combination thereof. In embodiments, the process further comprises measuring the distillate temperature in the distillate conduit and adjusting at least one of: the jacket temperature, the vacuum level, or a combination thereof, to control the temperature of the distillate thereby controlling the particle size change or particle size shift of the latex particles by the selection of distillate temperature.

Thus, the latex particles have a first particle size or particle size distribution before solvent removal and a second particle size or particle size distribution after solvent removal, wherein the first particle size or particle size distribution and the second particle size or particle size distribution are different; wherein the change in particle size is controlled by the selection of distillate temperature. In embodiments, the difference in particle size or particle size distribution is reduced or essentially eliminated by the selection of the distillate temperature.

"Average" particle or drop size is typically represented as D50 or $d_{50}$, or defined as the volume median particle size value at the 50th percentile of the particle size distribution, wherein 50% of the particles in the distribution are greater than the $d_{50}$ particle size value, and the other 50% of the particles in the distribution are less than the $d_{50}$ value. Average particle size can be measured by methods that use light scattering technology to infer particle size, such as Dynamic Light Scattering. The particle diameter refers to the length of an individual drop of the discontinuous layer as derived from images of the particles generated by Transmission Electron Microscopy or from Dynamic Light Scattering measurements.

In embodiments, the latex particles have an average particle size (such as particle diameter or longest dimension) of from about 3 to about 500 nanometers (nm), or about 10 to about 500 nm, or about 10 to about 300 nm, or about 10 to about 50 nm, or about 5 to about 100 nm, or about 2 to about 20 nm, or about 25 nm. In embodiments, the particle size distribution of the latex particles in the latex emulsion is from about 40 to about 500 nanometers or from about 50 to about 500 nanometers with D50 average particle size of about 200 nanometers, as measured with a Microtrac Nanotrac™ 252 analyzer.

In embodiments, the vacuum level, jacket temperature, or combination thereof, are modified to control the distillate temperature during solvent removal such that the distillate temperature is controlled in a range of from about 30 to about 80° C., or from about 40 to about 60° C., wherein the temperature is selected based on the resin type in combination with the solvent or solvents used in the phase inversion emulsification process. Where the particle size distribution is described using three x-axis values for particle diameter, D10, D50, and D95, wherein D50 is the diameter where half of the population lies below this value, D95 is the diameter where 95 percent of the population lies below this value, and D10 is the diameter where 10 percent of the population lies below this value, in embodiments, the distillate temperature is selected to provide a particle size distribution of the latex wherein D50 is from about 50 to 500 nanometers, or from about 150 to about 300 nanometers, D10 is from about 3 to about 300 nanometers, or from about 50 to about 175 nanometers, and D95 is from about 150 to about 750 nanometers, or from about 200 to about 500 nanometers. The distillate temperature selected during solvent removal thus controls the particle size distribution change during solvent removal, which can be shown as a change in the D50 and its associated D10 and D95.

In certain embodiments, the latex particles in the latex emulsion have a particle size distribution of from about 50 nanometers to about 500 nanometers with a D50 average particle size of about 200 nanometers as measured by as measured with a Microtrac Nanotrac™ 252 analyzer.

In embodiments, the D50 particle size change, that is, the D50 particle size before and after solvent removal, is reduced or eliminated. In embodiments, the change in D50 particle size before and after solvent removal is less than about 50 nanometers, less than about 20 nanometers, or less than about 10 nanometers.

Resins.

Any suitable or desired resin may be utilized in forming a latex emulsion of the present disclosure. The resin may be selected from the group consisting of amorphous resin, crystalline resin, and combinations thereof.

In embodiments, the resin may be a polyester resin, including the resins described, for example, in U.S. Pat. Nos. 6,593,049 and 6,756,176, the disclosure of each of which hereby is incorporated by reference in there entireties. Suitable resins also may include a mixture of an amorphous polyester resin and a crystalline polyester resin as described in U.S. Pat. No. 6,830,860, the disclosure of which is hereby incorporated by reference in its entirety. Suitable resins may include a mixture of high molecular weight and low molecular weight amorphous polyester.

In embodiments, the resin is polyester. In certain embodiments, the resin is amorphous polyester, crystalline polyester, or a mixture thereof.

In embodiments, the resin may be a polyester resin formed by reacting a diol with a diacid in the presence of an optional catalyst.

The diol may be provided in any suitable or desired amount. In embodiments, the diol may be selected in an amount of from about 40 to about 60 mole percent, or from about 42 to about 55 mole percent, or from about 45 to about 53 mole percent, and, optionally, a second diol can be selected in an amount of from about 0 to about 10 mole percent, or from about 1 to about 4 mole percent of the resin. The diacid may be selected in any suitable or desired amount, in embodiments, in an amount of from about 40 to about 60 mole percent, from about 42 to about 52 mole percent, or from about 45 to about 50 mole percent, and optionally, a second diacid may be selected in an amount of from about 0 to about 10 mole percent of the resin.

For forming a crystalline polyester, one or more polyol branching monomers can be reacted with a diacid in the presence of an optional catalyst and a further organic diol suitable for forming the crystalline resin including aliphatic diols having from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol, and mixtures and combinations thereof, including their structural isomers. The aliphatic diol may be present in any suitable or desired amount, such as from about 25 to about 60 mole percent, or from about 25 to about 55 mole percent, or from about 25 to about 53 mole percent of the resin. In embodiments, a third diol can be selected from the above-described diols in an amount of from about 0 to about 25 mole percent, or from about 1 to about 10 mole percent of the resin.

Examples of organic diacids or diesters including vinyl diacids or vinyl diesters that can be selected for the preparation of the crystalline resin include oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid, mesaconic acid, a diester or anhydride thereof, and mixtures and combinations thereof. The organic diacid can be present in any suitable or desired amount, in embodiments, from about 25 to about 60 mole percent, or from about 25 to about 52 mole percent, or from about 25 to about 50 mole percent. In embodiments, a second diacid can be selected from the above-described diacids and can be present in an amount of from about 0 to about 25 mole percent of the resin.

For forming crystalline polyester, one or more polyacid branching monomers can be reacted with a diol in the presence of an optional catalyst and a further organic diacid or diester. The components can be selected in any suitable or desired ratio. In embodiments, the branching monomer can be provided in an amount of from about 0.1 to about 15 mole percent, or from about 1 to about 10 mole percent, or from about 2 to about 5 mole percent, and, in embodiments, a second branching monomer can be selected in any suitable or desired amount, in embodiments, from about 0 to about 10 mole percent, or from about 0.1 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylenesuccinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(decylene-sebacate), poly(decylene-decanoate), poly(ethylene-decanoate), poly(ethylene dodecanoate), poly(nonylene-sebacate), poly(nonylene-decanoate), copoly(ethylene-fumarate)-copoly(ethylene-sebacate), copoly(ethylene-fumarate)-copoly(ethylene-decanoate), copoly(ethylene-fumarate)-copoly(ethylene-dodecanoate), copoly(2,2-dimethylpropane-1,3-diol-decanoate)-copoly(nonylene-decanoate), poly(octylene-adipate). Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinimide), and poly(propylene-sebecamide). Examples of polyimides include poly(ethylene-adipimide), poly(propy-lene-adipimide), poly(butylene-adipimide), poly(pentylene-adipimide), poly(hexylene-adipimide), poly(octylene-adipimide), poly(ethylene-succinimide), poly(propylene-succinimide) and poly(butylene-succinimide).

The crystalline resin may be present in any suitable or desired amount, or may be absent; that is, present at 0 percent.

The crystalline resin may be present in any suitable or desired amount. In embodiments, the crystalline resin may be present in an amount of from about 1 to about 50 percent by weight of the toner components, or from about 5 to about 35 percent by weight of the toner components. The crystalline resin may possess various melting points of, for example, from about 30° C. to about 120° C., or from about 50° C. to about 90° C. The crystalline resin may have a number average molecular weight (Mn), as measured by gel permeation chromatography (GPC) of, for example, from about 1,000 to about 50,000, or from about 2,000 to about 25,000, and a weight average molecular weight (Mw) of, for example, from about 2,000 to about 100,000, or from about 3,000 to about 80,000, as determined by GPC. The molecular weight distribution (Mw/Mn) of the crystalline resin may be, for example, from about 2 to about 6, from about 3 to about 4.

Examples of diacids or diesters suitable for use in forming the amorphous resin herein include vinyl diacids or vinyl diesters used for the preparation of amorphous polyester resins including dicarboxylic acids or diesters such as terephthalic acid, phthalic acid, isophthalic acid, fumaric acid, trimellitic acid, dimethyl fumarate, dimethyl itaconate, cis-1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, lutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethladipate, dimethyl dodecylsuccinate, and mixtures and combinations thereof.

The organic diacid or diester may be present in any suitable or desired amount, such as from about 35 to about 60 mole percent of the resin, or from about 42 to about 52 mole percent of the resin, or from about 45 to about 50 mole percent of the resin.

Examples of diols which may be used to prepared the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and mixtures and combinations thereof.

The organic diol can be present in any suitable or desired amount, such as from about 35 to about 60 mole percent of the resin, or from about 42 to about 55 mole percent of the resin, or from about 45 to about 53 mole percent of the resin.

In embodiments, polycondensation catalysts may be used in forming the polyesters. Polycondensation catalysts which may be utilized for either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, and mixtures and combinations thereof. Such catalysts may be utilized in any suitable or desired amount, such as from about 0.01 mole percent to about 5 mole percent based on the starting diacid or diester used to generate the polyester resin.

Other suitable resins that can be used to make toner comprise styrene, acrylate, such as, an alkyl acrylate, such as, methyl acrylate, ethyl acrylate, butyl acrylate, isobutyl acrylate, dodecyl acrylate, n-octyl acrylate, n-butylacrylate, 2-chloroethyl acrylate; β-carboxy ethyl acrylate (β-CEA), phenyl acrylate, methacrylate, butadienes, isoprenes, acrylic acids, acrylonitriles, styrene acrylates, styrene butadienes, styrene methacrylates, and so on, such as, methyl a-chloroacrylate, methyl methacrylate, ethyl methacrylate, butyl methacrylate, butadiene, isoprene, methacrylonitrile, acrylonitrile, vinyl ethers, such as, vinyl methyl ether, vinyl isobutyl ether, vinyl ethyl ether and the like; vinyl esters, such as, vinyl acetate, vinyl propionate, vinyl benzoate and vinyl butyrate; vinyl ketones, such as, vinyl methyl ketone, vinyl hexyl ketone, methyl isopropenyl ketone and the like; vinylidene halides, such as, vinylidene chloride, vinylidene chlorofluoride and the like; N-vinyl indole, N-vinyl pyrrolidone, methacrylate, acrylic acid, methacrylic acid, acrylamide, methacrylamide, vinylpyridine, vinylpyrrolidone, vinyl-M-methylpyridinium chloride, vinyl naphthalene, p-chlorostyrene, vinyl chloride, vinyl bromide, vinyl fluoride, ethylene, propylene, butylene, isobutylene and mixtures thereof. A mixture of monomers can be used to make a copolymer, such as, a block copolymer, an alternating copolymer, a graft copolymer and so on.

In embodiments, an amorphous resin or combination of amorphous resins utilized in the latex may have a glass transition temperature (Tg) of from about 30° C. to about 80° C., or from about 35° C. to about 70° C. In embodiments, the combined resins utilized in the latex may have a melt viscosity of from about 10 to about 1,000,000 Pa*S at about 130° C., or from about 50 to about 100,000 Pa*S at about 130° C.

One, two or more resins may be used. In embodiments, where two or more resins are used, the resins may be in any suitable ratio (e.g., weight ratio), such as, of from about 1% (first resin)/99% (second resin) to about 99% (first resin)/1% (second resin), in embodiments, from about 10% (first resin)/90% (second resin) to about 90% (first resin)/10% (second resin).

The resin particles may be of any suitable or desired size. In embodiments, the resin particle size is selected or controlled by the process for controlling latex particle size herein comprising regulating the distillate temperature by adjusting the jacket temperature of the reactor, adjusting the vacuum level of the reactor, or a combination thereof.

The resin can be prepared by any suitable or desired method. For example, one or more monomers can be combined with one or more acid or diester components in the optional presence of a catalyst, heated, optionally in an inert atmosphere, to condense the monomers into prepolymers. To this mixture can be added one or more diacids or diesters, optionally additional catalyst, optionally a radical inhibitor, with heating, optionally under inert atmosphere, to form the desired final resin (polyester).

Heating can be to any suitable or desired temperature, such as from about 140° C. to about 250° C., or about 160° C. to about 230° C., or about 180° C. to about 220° C.

Any suitable inert atmosphere conditions can be selected, such as under nitrogen purge.

If desired, a radical inhibitor can be used. Any suitable or desired radical inhibitor can be selected, such as hydroquinone, toluhydroquinone, 2,5-DI-tert-butylhydroquinone, and mixtures and combinations thereof. The radical inhibitor can be present in any suitable or desire amount, such as from about 0.01 to about 1.0, about 0.02 to about 0.5, or from about 0.05 to about 0.2 weight percent of the total reactor charge.

In embodiments, the resin can be pre-blended with a weak base or neutralizing agent. In embodiments, the base can be a solid, thereby eliminating the need to use a solution, which avoids the risks and difficulties associated with pumping a solution.

In embodiments, the resin and the neutralizing agent can be simultaneously fed through a co-feeding process which may accurately control the feed rate of the neutralizing agent and the resin into an extruder and which may then be melt mixed followed by emulsification.

In embodiments, the neutralizing agent can be used to neutralize acid groups in the resins. Any suitable or desired neutralizing agent can be selected. In embodiments, the neutralizing agent can be selected from the group consisting of ammonium hydroxide, potassium hydroxide, sodium hydroxide, sodium carbonate, sodium bicarbonate, lithium hydroxide, potassium carbonate, and mixtures and combinations thereof.

The neutralizing agent can be used as a solid, such as sodium hydroxide flakes, etc., in an amount of from about 0.001% to about 50% by weight, or from about 0.01% to about 25% by weight, or from about 0.1% to about 5% by weight, based on the weight of the resin.

In certain embodiments, the neutralizing agent is a solid neutralizing agent selected from the group consisting of ammonium hydroxide flakes, potassium hydroxide flakes, sodium hydroxide flakes, sodium carbonate flakes, sodium bicarbonate flakes, lithium hydroxide flakes, potassium carbonate flakes, organoamines, and mixtures and combinations thereof.

In embodiments, the neutralizing agent can be sodium hydroxide flakes. In embodiments, the surfactant used can be an aqueous solution of alkyldiphenyloxide disulfonate to ensure that proper resin neutralization occurs when using sodium hydroxide flakes and leads to a high quality latex with low coarse content. Alternatively, a solid surfactant of sodium dodecyl benzene sulfonate can be used and co-fed with the resin into the extruder feed hopper eliminating the need to use a surfactant solution thereby providing a simplified and efficient process.

An emulsion formed in accordance with the present process can also include a small amount of water, in embodiments, deionized water, in any suitable or desired amount, such as from about 20% to about 300%, or from about 30% to about 150%, by weight of the resin, at temperatures that melt or soften the resin, such as from about 40° C. to about 140° C., or from about 60° C. to about 100° C.

Further, any other monomer suitable for preparing a latex such as for use in a toner may be utilized as the resin. As noted above, in embodiments, the toner may be produced by emulsion aggregation. Suitable monomers useful in forming a latex polymer emulsion, and thus the resulting latex particles in the latex emulsion, include, but are not limited to, styrenes, acrylates, methacrylates, butadienes, isoprenes, acrylic acids, methacrylic acids, acrylonitriles, combinations thereof, and the like.

In embodiments, the latex polymer may include at least one polymer. Exemplary polymers include styrene acrylates, styrene butadienes, styrene methacrylates, and more specifically, poly(styrene-alkyl acrylate), poly(styrene-1,3-diene), poly(styrene-alkyl methacrylate), poly (styrene-alkyl acrylate-acrylic acid), poly(styrene-1,3-diene-acrylic acid), poly(styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly (styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly (styrene-butyl acrylate), poly (styrene-butadiene-acrylic acid), poly(styrene-butadiene-methacrylic acid), poly (styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), poly (styrene-butyl acrylate-acrylonitrile-acrylic acid), poly (styrene-butadiene), poly(styrene-isoprene), poly(styrene-butyl methacrylate), poly(styrene-butyl acrylate-acrylic acid), poly(styrene-butyl methacrylate-acrylic acid), poly (butyl methacrylate-butyl acrylate), poly(butyl methacrylate-acrylic acid), poly(acrylonitrile-butyl acrylate-acrylic acid), and combinations thereof. The polymers may be block, random, or alternating copolymers.

In embodiments, the resin is selected from the group consisting of styrenes, acrylates, methacrylates, butadienes, isoprenes, acrylic acids, methacrylic acids, acrylonitriles, and combinations thereof.

In certain embodiments, the resin is selected from the group consisting of poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylateisoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), and combinations thereof; amorphous polyester, crystalline polyester, or a mixture thereof; a crystalline polyester formed by reacting one or more polyol branching monomers with a diacid or diester in the presence of an optional catalyst and a further organic diol suitable for forming the crystalline resin, wherein the further organic diol is selected from the group consisting of 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol, and mixtures and combinations thereof, including their structural isomers; wherein the diacid or diester is selected from the group consisting of oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid, mesaconic acid, a diester or anhydride thereof, and mixtures and combinations thereof; and an amorphous polyester formed by reacting one or more polyol branching monomers with a diacid or diester in the presence of an optional catalyst and a further organic diol suitable for forming the amorphous resin, wherein the diacid or diester is selected from the group consisting of terephthalic acid, phthalic acid, isophthalic acid, fumaric acid, trimellitic acid, dimethyl fumarate, dimethyl itaconate, cis-1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, lutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethladipate, dimethyl dodecylsuccinate, and mixtures and combinations thereof; wherein the further organic diol is selected from the group consisting of 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cycloheaxanediol, diethylene glycol, bis(2-hydroxyethyl)oxide, dipropylene glycol, dibutylene, and mixtures and combinations thereof.

In embodiments, the latex may be prepared in an aqueous phase containing a surfactant or co-surfactant. Surfactants which may be utilized with the polymer to form a latex dispersion can be ionic or nonionic surfactants, or combinations thereof, in an amount of from about 0.01 to about 15 weight percent of the solids, and in embodiments of from about 0.1 to about 10 weight percent of the solids.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abietic acid available from Aldrich, NEOGEN R™, NEOGEN SC™ obtained from Daiichi Kogyo Seiyaku Co., Ltd., combinations thereof, and the like.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, C12, C15, C17 trimethyl ammonium bromides, combinations thereof, and the like. Other cationic surfactants include cetyl pyridinium bromide, halide salts of quaternized polyoxyethylalkylamines, dodecylbenzyl triethyl ammonium chloride, MIRAPOL® and ALKAQUAT® available from Alkaril Chemical Company, SANISOL (benzalkonium chloride), available from Kao Chemicals, combinations thereof, and the like. In embodiments a suitable cationic surfactant includes SANISOL® B-50 available from Kao Corp., which is primarily a benzyl dimethyl alkonium chloride.

Examples of nonionic surfactants include, but are not limited to, alcohols, acids and ethers, for example, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, combinations thereof, and the like. In embodiments commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ can be utilized.

The choice of particular surfactants or combinations thereof, as well as the amounts of each to be used, are within the purview of those skilled in the art.

In embodiments initiators may be added for formation of the latex polymer. Examples of suitable initiators include water soluble initiators, such as ammonium persulfate, sodium persulfate and potassium persulfate, and organic soluble initiators including organic peroxides and azo compounds including Vazo peroxides, such as VAZO 64™, 2-methyl 2-2'-azobis propanenitrile, VAZO 88™, 2-2'-azobis isobutyramide dehydrate, and combinations thereof. Other water-soluble initiators which may be utilized include azoamidine compounds, for example 2,2'-azobis(2-methyl-N-phenylpropionamidine) dihydrochloride, 2,2'-azobis[N-(4-chlorophenyl)-2-methylpropionamidine] di-hydrochloride, 2,2'-azobis[N-(4-hydroxyphenyl)-2-methyl-propionamidine]dihydrochloride, 2,2'-azobis[N-(4-amino-phenyl)-2-methylpropionamidine]tetrahydrochloride, 2,2'-azobis[2-methyl-N(phenylmethyl)propionamidine] dihydrochloride, 2,2'-azobis[2-methyl-N-2-propenylpropionamidine]dihydrochloride, 2,2'-azobis[N-(2-hydroxy-ethyl)2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis {2-[1-(2-hydroxyethyl)-2-imidazolin-2-yl]propane}dihydrochloride, combinations thereof, and the like.

Initiators can be added in suitable amounts, such as from about 0.1 to about 8 weight percent of the monomers, and in embodiments of from about 0.2 to about 5 weight percent of the monomers.

In embodiments, chain transfer agents may also be utilized in forming the latex polymer. Suitable chain transfer agents include dodecane thiol, octane thiol, carbon tetrabromide, combinations thereof, and the like, in amounts from about 0.1 to about 10 percent and, in embodiments, from about 0.2 to about 5 percent by weight of monomers, to control the molecular weight properties of the latex polymer when emulsion polymerization is conducted in accordance with the present disclosure.

Solvent.

Any suitable or desired organic solvent may be used to dissolve the resin, for example, alcohols, esters, ethers, ketones, amines and combinations thereof, in an amount of, for example, from about 30% by weight to about 400% by weight of the resin, from about 40% by weight to about 250% by weight of the resin, from about 50% by weight to about 100% by weight of the resin.

In embodiments, suitable organic solvents, some-times referred to herein, in embodiments, as phase inversion agents, include, for example, methanol, ethanol, propanol, IPA, butanol, ethyl acetate, MEK and combinations thereof. In embodiments, the organic solvent may be immiscible in water and may have a boiling point of from about 30° C. to about 120° C. In embodiments when at least two solvents are used, the ratio of solvents can be any suitable or desired ration, for example, from about 1:2 to about 1:15, from about 1:2.5 to about 1:12.5, from about 1:3 to about 1:10, from about 1:3.5 to about 1:7.5. Thus, if the first solvent is IPA and the second solvent is MEK, the ratio of IPA to MEK can be, for example, about 1:4.

In embodiments, the organic solvent is selected from the group consisting of methanol, ethanol, isopropanol, butanol, ethylene glycol, glycerol, sorbitol, acetone, 2-butanone, 2-pentanone, 3-pentanone, ethyl isopropyl ketone, methyl isobutyl ketone, diisobutyl ketone, methyl ethyl ketone, dimethylformamide, dimethylacetamide, N-meth-ylpyrrolidone, 1,2-dimethyl-2-imidazolidinone, acetonitrile, propionitrile, butyronitrile, isobutyronitrile, valeronitrile, benzonitrile, ditertbutyl ether, dimethoxyethane, 2-methoxy-ethyl ether, 1,4-dioxane, tetrahydrohyran, morpholine, methylsulfonylmethane, sulfolane, dimethylsulfoxide, hexamethylphosphoramide, benzenes, esters, amines, and combinations thereof.

In embodiments, the organic solvent comprises a combination of at least two organic solvents.

Neutralizing Agent.

As described above, a neutralizing agent may be employed in the processes herein. In embodiments, the resin optionally may be mixed with a weak base or a neutralizing agent. In embodiments, the neutralizing agent may be used to neutralize acid groups in the resins, so a neutralizing agent herein may also be referred to as a "basic neutralization agent." Any suitable basic neutralization reagent may be used in accordance with the present disclosure. In embodiments, suitable basic neutralization agents may include both inorganic basic agents and organic basic agents. Suitable basic agents may include ammonium hydroxide, potassium hydroxide, sodium hydroxide, sodium carbonate, sodium bicarbonate, lithium hydroxide, potassium carbonate, combinations thereof and the like. Suitable basic agents may also include monocyclic compounds and polycyclic compounds including aziridines, azetidines, piperazines, peiperidines, pyridines, bipyridines, terpyridines, dihydropy-ridines, morpholines, N-alkylmorpholines, 1,4-diazabicyclo[2.2.2]octanes, 1,8-diazabicycloundecanes, 1,8-diazabicycloundecenes, dimethylated pentylamines, trimethylated pentylamines, pyrimidines, pyrroles, pyrrolidines, pyrrolidinones, indoles, indolines, indanones, benzindazones, imidazoles, benzimidazoles, imidazolones, imidazolines, oxazoles, isoxazoles, oxazolines, oxadiazoles, thiadiazoles, carbazoles, quinolines, isoquinolines, naphthy-ridines, triazines, triazoles, tetrazoles, pyrazoles, pyrazolines and combinations thereof. In embodiments, the monocyclic and polycyclic compounds may be unsubstituted or substituted at any carbon position on the ring.

In embodiments, an emulsion formed in accordance with the present disclosure includes a small quantity of water, in embodiments, de-ionized water (DIW) in amounts and at temperatures that melt or soften the resin, of from about 25°

C. to about 120° C., from about 35° C. to about 80° C. The basic agent may be utilized in an amount of from about 0.001% by weight to 50% by weight of the resin, from about 0.01% by weight to about 25% by weight of the resin, from about 0.1% by weight to 5% by weight of the resin. In embodiments, the neutralizing agent may be added in the form of an aqueous solution. In embodiments, the neutralizing agent may be added in the form of a solid. In embodiments, plural forms of bases are used in a process of interest. Hence, a process can comprise a first base, and at a different or successive step, a second base is used. The first and second bases can be the same or different.

Utilizing the above basic neutralization agent in combination with a resin possessing acid groups, a neutralization ratio of from about 25% to about 300% may be achieved, from about 50% to about 200%. In embodiments, the neutralization ratio may be calculated as the molar ratio of basic groups provided with the basic neutralizing agent to the acid groups present in the resin multiplied by 100%.

As noted above, the basic neutralization agent may be added to a resin possessing acid groups. The addition of the basic neutralization agent may thus raise the pH of an emulsion including a resin possessing acid groups from about 5 to about 12, or from about 6 to about 11. The neutralization of the acid groups may, in embodiments, enhance formation of the emulsion.

Surfactant.

In embodiments, the process of the present disclosure may optionally include adding a surfactant, for example, before or during combining reagents, to the resin at an elevated temperature, in an emulsion, in a dispersion and so on. The surfactant may be added prior to mixing the resin at an elevated temperature.

Where utilized, a resin emulsion may include one, two or more surfactants. The surfactants may be selected from ionic surfactants and nonionic surfactants. Anionic surfactants and cationic surfactants are encompassed by the term, "ionic surfactants." In embodiments, the surfactant may be added as a solid or as a solution with a concentration of from about 5% to about 100% (pure surfactant) by weight, in embodiments, from about 10% to about 95% by weight. In embodiments, the surfactant may be utilized so that it is present in an amount of from about 0.01% to about 20% by weight of the resin, from about 0.1% to about 16% by weight, from about 1% to about 14% by weight of the resin.

Processing.

The present process may comprise forming a mixture by any known means, optionally, at an elevated temperature above room temperature, containing at least one resin, at least one organic solvent, optionally a surfactant, and optionally a neutralizing agent to form a latex emulsion. In embodiments, the resins may be pre-blended prior to combining or mixing. In embodiments, the elevated temperature may be a temperature near to or above the Tg of the resin(s). In embodiments, the resin may be a mixture of low and high molecular weight amorphous resins.

Thus, in embodiments, a process of the present disclosure may include contacting at least one resin with an organic solvent to form a resin mixture, heating the resin mixture to an elevated temperature, stirring the mixture, optionally adding a neutralizing agent to neutralize the acid groups of the resin, adding water in two portions into the mixture until phase inversion occurs to form a phase inversed latex emulsion, distilling the latex to remove a water solvent mixture in the distillate and producing a latex, such as, with a low polydispersity, a lower percentage of fines, coarse particles, and so on, and further including regulating the distillate temperature in order to control the latex particle size, wherein regulating the distillate temperature can be by any suitable or desired method, in embodiments, by adjusting the jacket temperature of the reactor, adjusting the vacuum level of the reaction, a combination thereof, or any other suitable or desired method.

In the phase inversion process, resin, such as, an amorphous and/or a combination of at least one amorphous and crystalline polyester resins may be dissolved in a low boiling point organic solvent, which solvent is miscible or partially miscible in water, such as, MEK and any other solvent noted hereinabove, at a concentration of from about 1% by weight to about 75% by weight resin in solvent, from about 5% by weight to about 60% by weight resin in solvent. The resin mixture is then heated to a temperature of from about 25° C. to about 90° C., from about 30° C. to about 85° C. The heating need not be held at a constant temperature, but may be varied. For example, the heating may be slowly or incrementally increased until a desired temperature is achieved.

In embodiments, a latex may be obtained using a more than one solvent PIE process which requires dispersing and solvent stripping steps. In that process, the resin may be dissolved in a combination of more than one organic solvents, for example, MEK and IPA, to produce a uniform organic phase.

An amount of a base solution (such as, ammonium hydroxide) may be added into the organic phase to neutralize acid end groups of the resin.

Water is added in two portions to form a uniform dispersion of resin particles in water through phase inversion.

The organic solvents remain in both the resin particles and water phase at that state. Through vacuum distillation, for example, the organic solvents can be stripped.

In embodiments, the resin to two or more solvents (for example, MEK and IPA) ratios may be from about 10:8 to about 10:12, from about 10:8.5 to about 10:11.5, or from about 10:9 to about 10:11. When two solvents are used, and a low molecular weight (LMW) resin is included, the ratio of the LMW resin to the first and to the second solvents can be from about 10:6:1.5 to about 10:10:2.5. When a high molecular weight (HMW) resin is included with two solvents, the ratio of the HMW resin to the first and to the second solvents can be from about 10:8:2 to about 10:11:3, although amounts outside of those ranges noted above can be used.

In embodiments, the neutralizing agent includes the agents mentioned hereinabove. In embodiments, a surfactant may or may not be added to the resin, where the surfactant when utilized may be any of the surfactants mentioned hereinabove to obtain a latex with lower coarse content, where a coarse particle is greater than 100 nm in size.

In embodiments, the optional surfactant may be added to the one or more ingredients of the resin composition before, during or after mixing. In embodiments, the surfactant may be added before, during or after addition of the neutralizing agent. In embodiments, the surfactant may be added prior to the addition of the neutralizing agent. In embodiments, a surfactant may be added to the pre-blend mixture.

Any suitable or desired mixing temperature may be selected. In embodiments, the mixing temperature may be from about 35° C. to about 100° C., from about 40° C. to about 90° C., or from about 50° C. to about 70° C.

Once the resins, optional neutralizing agent and optional surfactant are combined, the mixture may then be contacted with a first portion of a water, to form a W/O emulsion. Water may be added to form a latex with a solids content of from about 5% to about 60%, from about 10% to about 50%. While higher water temperatures may accelerate dissolution, latexes may be formed at temperatures as low as room temperature (RT). In embodiments, water temperatures may be from about 40° C. to about 110° C., or from about 50° C. to about 90° C.

The amount of water comprising the first portion of water is an amount suitable to form a W/O emulsion. Phase inversion can occur at about a 1:1 w/w or v/v ratio of organic phase to aqueous phase. Hence, the first portion of water generally comprises less than about 50% of the total volume or weight of the final emulsion. The first portion of water can be less than about 95% of the volume or weight of the organic phase, less than about 90%, less than about 85%, less than about 80% of the volume or weight of the organic phase. Lower amounts of water can be used in the first portion so long as a suitable W/O emulsion is formed.

Phase inversion occurs on adding an optional aqueous alkaline solution or basic agent, optional surfactant and second portion of water to create a phase inversed emulsion including a dispersed phase including droplets possessing the molten ingredients of the resin composition and a continuous phase including the surfactant and/or water composition.

Combining may be conducted, in embodiments, utilizing any means within the purview of those skilled in the art. For example, combining may be conducted in a glass kettle with an anchor blade impeller, an extruder, i.e., a twin screw extruder, a kneader, such as, a Haake mixer, a batch reactor or any other device capable of intimately mixing viscous materials to create near or homogenous mixtures.

Stirring, although not necessary, may be utilized to enhance formation of the latex. Any suitable stirring device may be utilized. In embodiments, the stirring may be at a speed of from about 10 revolutions per minute (rpm) to about 5,000 rpm, from about 20 rpm to about 2,000 rpm, from about 50 rpm to about 1,000 rpm. The stirring need not be at a constant speed and may be varied. For example, as the heating of the mixture becomes more uniform, the stirring rate may be increased. In embodiments, a homogenizer (that is, a high shear device), may be utilized to form the phase inversed emulsion, in embodiments, the process of the present disclosure may take place without the use of a homogenizer. Any suitable or desired homogenizer can be selected, such as a rotor-stator homogenizer, a piston seat homogenizer, or other suitable device. Where a rotor-stator homogenizer is utilized, the rotor-stator homogenizer may operate, in embodiments, at a rate of from about 3,000 rpm to about 10,000 rpm.

Although the point of phase inversion may vary depending on the components of the emulsion, the temperature of heating, the stirring speed, and the like, phase inversion may occur when the optional basic neutralization agent, optional surfactant, and water are added so that the resulting resin is present in an amount from about 5% by weight to about 70% by weight of the emulsion, from about 20% by weight to about 65% by weight, from about 30% by weight to about 60% by weight of the emulsion.

Following phase inversion, additional optional surfactant, water, and optional aqueous alkaline solution may be added to dilute the phase inversed emulsion, although not required. Following phase inversion, the inversed emulsion may be cooled to room temperature, for example from about 20° C. to about 25° C.

In embodiments, distillation with stirring of the organic solvent may be performed to provide resin emulsion particles with an average diameter size of less than 100 nanometers (nm), less than about 95 nm, or less than about 90 nm. In embodiments, distillation comprises forming a distillate and controlling the distillate temperature by at least one of: adjusting the jacket temperature, adjusting the vacuum level, or a combination thereof; d) wherein volatile organic compounds are pulled out of the liquid phase in the reactor to a vapor phase and transferred to the condenser via the distillate conduit; e) cooling distillate vapor in the condenser to a liquid phase; and f) collecting the liquid condensate in the receiver.

The desired properties of the resin emulsion (i.e., particle size and low residual solvent level) may be achieved by adjusting the solvent and neutralizer concentration and process parameters (i.e., reactor temperature, vacuum and process time).

Further, the desired properties of the resin emulsion (i.e., particle size and low residual solvent level) may be achieved by controlling the distillate temperature, in embodiments, by at least one of: adjusting the jacket temperature, adjusting the vacuum level, or a combination thereof.

In embodiments, the distillate temperature range for the process herein resin can be selected based on parameters including, but not limited to, the boiling point of the solvent or solvents, the heat sensitivity of the specific resin or resin system, or a combination thereof. In embodiments, a temperature range for removal of solvents can be any suitable or desired range selected for the resin and solvent characteristics. In embodiments, the distillate temperature range is from about 30 to about 80° C., or from about 30 to about 50° C. In certain embodiments, the distillate temperature range is from about 44 to about 46 C, or from about 44 to about 45° C., or about 44.8° C. In a specific embodiment, the distillate temperature is 44.8° C.

In embodiments, the coarse content of the latex of the present disclosure, that is, particles that are larger than most prevalent or desired population of particles, may be from about 0.01% by weight to about 5% by weight, from about 0.1% by weight to about 3% by weight. The solids content of the latex of the present disclosure may be from about 10% by weight to about 60%, from about 20% by weight to about 50% by weight.

Toner.

Once the resin mixture has been contacted with water to form an emulsion and the solvent removed from the mixture as described above, the resulting latex may then be utilized to form a toner by any method within the purview of those skilled in the art. Although embodiments relating to toner particle production are described below with respect to emulsion aggregation processes, any suitable method of preparing toner particles may be used, including, chemical processes, such as, suspension and encapsulation processes disclosed in U.S. Pat. Nos. 5,290,654 and 5,302,486, the disclosure of each of which is hereby incorporated by reference herein in their entireties.

In embodiments, toner compositions and toner particles may be prepared by aggregation and coalescence processes in which smaller-sized resin particles are aggregated to the appropriate toner particle size and then coalesced to achieve the final toner particle shape and morphology.

The latex emulsion may be contacted with an optional colorant, optionally in a dispersion, and other additives to form an ultra low melt toner by a suitable process, in embodiments, an emulsion aggregation and coalescence process.

In embodiments, the optional additional ingredients of a toner composition including optional colorant, wax and other additives, may be added before, during or after melt mixing the resin to form the latex emulsion of the present disclosure. The additional ingredients may be added before, during or after formation of the latex emulsion. In embodiments, the colorant may be added before the addition of the surfactant.

In embodiments, toner compositions may be prepared by emulsion aggregation processes, such as, a process that includes aggregating a mixture of an optional colorant, an optional wax and any other desired or required additives, and emulsions including the resins described above, optionally in surfactants as described above, and then coalescing the aggregate mixture. A mixture may be prepared by adding a colorant and optionally a wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. The pH of the mixture may be adjusted to from about 2 to about 5. Additionally, in embodiments, the mixture may be homogenized. If the mixture is homogenized, that may be by mixing using any suitable or desired parameters. In certain embodiments, mixing may be accomplished at from about 600 to about 6,000 rpm. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, an inorganic cationic aggregating agent, such as, polyaluminum halides, such as, polyaluminum chloride (PAC), or the corresponding bromide, fluoride or iodide, polyaluminum silicates, such as, polyaluminum sulfosilicate (PASS), and water soluble metal salts, including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate and combinations thereof. In embodiments, the aggregating agent may be added to the mixture at a temperatures that is below the Tg of the resin.

Suitable examples of organic cationic aggregating agents include, for example, dialkyl benzenealkyl ammonium chloride, lauryl trimethyl ammonium chloride, alkyl-benzyl methyl ammonium chloride, alkyl benzyl dimethyl ammonium bromide, benzalkonium chloride, cetylpyri-dinium bromide, $C_{12}C_{15}C_{17}$-trimethyl ammonium bromides, halide salts of quaternized polyoxyethylalkylamines, dode-cylbenzyl triethyl ammonium chloride, combinations thereof and the like.

Other suitable aggregating agents also include, but are not limited to, tetraalkyl titinates, dialkyltin oxide, tetraalkyltin oxide hydroxide, dialkyltin oxide hydroxide, aluminum alkoxides, alkyl zinc dialkyl zinc, zinc oxides, stannous oxide, dibutyltin oxide, dibutyltin oxide hydroxide, tetraalkyl tin, combinations thereof and the like. Where the aggregating agent is a polyion aggregating agent, the agent may have any desired number of polyion atoms present. For example, suitable polyaluminum compounds have from about 2 to about 13, from about 3 to about 8, aluminum ions present in the compound.

The aggregating agent may be added to the mixture utilized to form a toner in an amount of, for example, from about 0.1% to about 10% by weight, from about 0.2% to about 8% by weight, from about 0.3% to about 5% by weight, of the resin in the mixture.

The particles may be permitted to aggregate until a predetermined desired particle size is obtained. Particle size can be monitored during the growth process, for example with a COULTER COUNTER, for average particle size. The aggregation may proceed by maintaining the elevated temperature, or slowly raising the temperature to, for example, from about 40° C. to about 100° C., and holding the mixture at that temperature for a time of from about 0.5 hours to about 6 hours, from about 1 hour to about 5 hours, while maintaining stirring, to provide the aggregated particles. Once the desired size is reached, an optional shell resin can be added.

Once the desired final size of the toner particles is achieved, the pH of the mixture may be adjusted with a base to a value of from about 3 to about 10, or from about 5 to about 9. The adjustment of the pH may be utilized to freeze, that is, to stop, toner particle growth. The base utilized to stop toner growth may include any suitable base such as, for example, alkali metal hydroxides, such as, for example, sodium hydroxide, potassium hydroxide, ammonium hydroxide, combinations thereof and the like. In embodiments, a chelator, such as, ethylene diamine tetraacetic acid (EDTA), may be added to help adjust the pH to the desired values noted above.

Shell Resin.

In embodiments, after aggregation, but prior to coalescence, a resin coating may be applied to the aggregated particles to form a shell there over. In embodiments, the core may thus include an amorphous resin and/or a crystalline resin, as described above. Any resin described above may be utilized as the shell.

Multiple resins may be utilized in any suitable amounts. Thus, a first resin may be present in an amount of from about 20% by weight to about 100% by weight of the total shell resin, from about 30% by weight to about 90% by weight of the total shell resin. In embodiments, a second resin may be present in the shell resin in an amount of from about 0 percent by weight to about 80 percent by weight of the total shell resin, from about 10 percent by weight to about 70 percent by weight of the shell resin.

The shell resin may be applied to the aggregated particles by any method within the purview of those skilled in the art. In embodiments, the resins utilized to form the shell may be in an emulsion, including any surfactant described above. The emulsion possessing the resins, optionally the solvent-based resin latex neutralized with NaOH described above, may be combined with the aggregated particles described above so that the shell forms over the aggregated particles.

In embodiments, the formation of the shell over the aggregated particles may occur while heating to a temperature of from about 30° C. to about 80° C., or from about 35° C. to about 70° C. In embodiments, formation of the shell may take place for a period of time from about 5 minutes to about 10 hours, or from about 10 minutes to about 5 hours.

In embodiments, the shell may be present in an amount of from about 10% by weight to about 40% by weight of the latex particles, or from about 20% by weight to about 35% by weight of the latex particles.

In embodiments, the final size of the toner particles may be less than about 8 micrometers (μm), less than about 7 μm, or less than about 6 μm in size.

Coalescence.

Following aggregation to the desired particle size and application of any optional shell, the particles may then be coalesced to the desired final shape, the coalescence being achieved by, for example, heating the mixture to a temperature of from about 45° C. to about 100° C., or from about 55° C. to about 99° C., which may be at or above the Tg of the resin(s) utilized to form the toner particles. Coalescence may be accomplished over a period of from about 0.01 to about 9 hours, from about 0.1 to about 4 hours.

After aggregation and/or coalescence, the mixture may be cooled to room temperature, such as, from about 20° desired. A suitable cooling method may include introducing cold water to a jacket around the reactor. After cooling, the toner particles may be optionally washed with water and then dried. Drying may be accomplished by any suitable method for drying, including, for example, freeze-drying.

Additives.

In embodiments, the toner particles may contain other optional additives, as desired or required. For example, the toner may include positive or negative charge control agents, for example, in an amount of from about 0.1 to about 10% by weight of the toner, from about 1 to about 3% by weight of the toner. Examples of suitable charge control agents include quaternary ammonium compounds inclusive of alkyl pyridiniumhalides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts, such as, BONTRON E84™ or E88™ (Orient Chemical Industries, Ltd.); combinations thereof and the like.

There can also be blended with the toner particles external additive particles after formation including flow aid additives, which additives may be present on the surface of the toner particles. Examples of the additives include metal oxides, such as, titanium oxide, silicon oxide, aluminum oxides, cerium oxides, tin oxide, mixtures thereof and the like; colloidal and amorphous silicas, such as, AEROSIL®, metal salts and metal salts of fatty acids inclusive of zinc stearate and calcium stearate, or long chain alcohols, such as, UNILIN® 700, and mixtures thereof.

In general, silica may be applied to the toner surface for toner flow, tribo enhancement, admix control, improved development and transfer stability, and higher toner blocking temperature. $TiO_2$ may be applied for improved relative humidity (RH) stability, tribo control and improved development and transfer stability. Zinc stearate, calcium stearate and/or magnesium stearate may be used as an external additive for providing lubricating properties, developer conductivity, tribo enhancement and enabling higher toner charge and charge stability by increasing the number of contacts between toner and carrier particles. In embodiments, a commercially available zinc stearate known as Zinc Stearate L, obtained from Ferro Corp., may be used. The external surface additives may be used with or without a coating.

Each of the external additives may be present in an amount of from about 0.1% by weight to about 5% by weight of the toner, or from about 0.25% by weight to about 3% by weight of the toner, although the amount of additives can be outside of those ranges. In embodiments, the toners may include, for example, from about 0.1% by weight to about 5% by weight titania, from about 0.1% by weight to about 8% by weight silica, or from about 0.1% by weight to about 4% by weight zinc stearate.

In embodiments, the dry toner particles having a shell of the present disclosure may, exclusive of external surface additives, have the following characteristics: (1) volume average diameter (also referred to as "volume average particle diameter") of from about 3 to about 25 μm, from about 4 to about 15 μm, from about 5 to about 12 μm; (2) number average geometric size distribution (GSDn) and/or volume average geometric size distribution (GSDv) of from about 1.05 to about 1.55, from about 1.1 to about 1.4; and (3) circularity of from about 0.93 to about 1, in embodiments, from about 0.95 to about 0.99 (as measured with, for example, A Sysmex FPIA 2100 analyzer). The characteristics of toner particles may be determined by any suitable technique and apparatus, such as, a Beckman Coulter MULTISIZER 3.

In embodiments, a toner process herein comprises: a) combining a first resin, an organic solvent, an optional neutralizing agent, and a first portion of water in a reactor; wherein said reactor is equipped with a jacket, a vacuum, a condenser connected to the reactor by a distillate conduit, and a receiver connected to the condenser by a condensate conduit, to form a water-in-oil dispersion mixture; b) adding a second portion of water to the reactor to convert the water-in-oil dispersion mixture into an oil-in-water dispersion comprising a latex emulsion of latex particles; c) forming a distillate and controlling the distillate temperature by at least one of: adjusting the jacket temperature, adjusting the vacuum level, or a combination thereof; d) wherein volatile organic compounds are pulled out of the liquid phase in the reactor to a vapor phase and transferred to the condenser via the distillate conduit; e) cooling distillate vapor in the condenser to a liquid phase; f) collecting the liquid condensate in the receiver; g) optionally, adding a second resin to the latex emulsion obtained in step b); h) optionally, adding a crystalline resin to the latex emulsion obtained in step b); i) optionally, adding a wax, a colorant, or a combination thereof to the latex emulsion obtained in step b); j) optionally, adding a flocculent to the late emulsion obtained in step b); k) aggregating particles in said latex emulsion; l) freezing particle growth in said emulsion to form parent particles; m) optionally, adding a shell resin to form core-shell particles; o) optionally, coalescing the parent particles or the core-shell particles to form toner particles; and p) optionally, collecting the parent particles of l), the core-shell particles of m) or the toner particles of o).

In embodiments, the present disclosure includes a toner prepared with the process described herein.

In embodiments, the toner particles may further contain optional additives as desired or required. For example, the toner may include positive or negative charge control agents, such as in an amount of from about 0.1 to about 10%, or from about 1 to about 3% by weight of the toner. Examples of suitable charge control agents include quaternary ammonium compounds inclusive of alkyl pyridinium halides, bisulfates, alkyl pyridinium compounds, including those disclosed in U.S. Pat. No. 4,298,672, which is hereby incorporated by reference herein in its entirety, organic sulfate and sulfonate compositions, including those discloses in U.S. Pat. No. 4,338,390, which is hereby incorporated by reference herein in its entirety, cetyl pyridinium tetrafluoroborates, distearyl dimethyl ammonium methyl sulfate, aluminum salts such as CONTRON E84™ or E88™ (Orient Chemical Industries, Ltd.), and mixtures and combinations thereof.

There can also be blended with the toner particles external additive particles including flow aid additives, which additives may be present on the surface of the toner particles.

Examples of these additives include metal oxides such as titanium oxide, silicon oxide, aluminum oxide, cerium oxide, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN® 700, and mixtures and combinations thereof.

Silica may be applied to the toner surface for toner flow, tribo enhancement, admix control, improved development and transfer stability, and higher toner blocking temperature. $TiO_2$ may be applied for improved relative humidity (RH) stability, tribo control, and improved development and transfer stability. Zinc stearate, calcium stearate and/or magnesium stearate may optionally also be used as an external additive for providing lubricating properties, developer conductivity tribo enhancement, enabling higher toner charge and charge stability by increasing the number of contacts between toner an carrier particles. In embodiments, a commercially available zinc stearate known as Zinc Stearate L, available from Ferro Corporation, may be used. The external surface additives may be used with or without a coating.

Each of these external additives may be present in any suitable or desired amount, such as from about 0.1 percent by weight to about 5 percent by weight of the toner, or from about 0.2 percent by weight to about 3 percent by weight of the toner.

The latex emulsion containing the resin or resins may be utilized to form a toner by any method within the purview of those skilled in the art. The latex emulsion may be contacted with a colorant, optionally in the form of a colorant dispersion, and other additives to form a toner by a suitable process, in embodiments, an emulsion aggregation and coalescence process. In embodiments, the toner processes herein employ the latex emulsions herein to produce particle sizes that are suitable for emulsion aggregation ultra low melt processes.

Colorant.

One or more colorants may be added, and various known suitable colorants, such as dyes, pigments, mixtures of dyes, mixtures of pigments, mixtures of dyes and pigments, and the like, may be included in the toner. In embodiments, the colorant, when present, may be included in the toner in an amount of, for example, 0 to about 35% by weight of the toner, from about 1 to about 25% by weight of the toner, from about 3 to about 5% by weight of the toner, although the amount of colorant can be outside of those ranges, such as, about 7%, about 7.5%, about 8% by weight of the toner.

As examples of suitable colorants, mention may be made of carbon black like REGAL 330® (Cabot), Carbon Black 5250 and 5750 (Columbian Chemicals), Sunsperse Carbon Black LHD 9303 (Sun Chemicals); magnetites, such as magnetites; MAPICO BLACKS™ and surface treated magnetites; Pfizer magnetites CB-4799™, CB5300™, CB5600™, MCX6369™; Bayer magnetites, BAYFERROX 8600™, 8610™; Northern Pigments magnetites, NP604™, NP-608™; Magnox magnetites TMB-100™ or TMB-104™; and the like. As colored pigments, there can be selected cyan, magenta, yellow, red, green, brown, blue or mixtures thereof. Generally, cyan, magenta or yellow pigments or dyes or mixtures thereof, are used. The pigment or pigments are generally used as water-based pigment dispersions.

In embodiments, the colorant may include a pigment, a dye, combinations thereof, carbon black, magnetite, black, cyan, magenta, yellow, red, green, blue, brown, combinations thereof, in an amount sufficient to impart the desired color to the toner. It is to be understood that other useful colorants will become readily apparent based on the present disclosure.

Wax.

Optionally, a wax may also be combined with the resin and an optional colorant in forming toner particles. The wax may be provided in a wax dispersion, which may include a single type of wax or a mixture of two or more different waxes. A single wax may be added to toner formulations, for example, to improve particular toner properties, such as, toner particle shape, presence and amount of wax on the toner particle surface, charging and/or fusing characteristics, gloss, stripping, offset properties and the like. Alternatively, a combination of waxes can be added to provide multiple properties to the toner composition.

When included, the wax may be present in an amount of, for example, from about 1% by weight to about 25% by weight of the toner particles, from about 5% by weight to about 20% by weight of the toner particles, although the amount of wax can be outside of those ranges.

When a wax dispersion is used, the wax dispersion may include any of the various waxes conventionally used in emulsion aggregation toner compositions. Waxes that may be selected include waxes having, for example, an average molecular weight of from about 500 to about 20,000, from about 1,000 to about 10,000. Waxes that may be used include, for example, polyolefins, such as, polyethylene including linear polyethylene waxes and branched polyethylene waxes, polypropylene including linear polypropylene waxes and branched polypropylene waxes, polyethylene/amide, polyethylenetetrafluoroethylene, polyethylenetetrafluoroethylene/amide, naturally occurring waxes such as those obtained from plant sources or animal sources, and polybutene waxes. Mixtures and combinations of the foregoing waxes may also be used, in embodiments. In embodiments, the waxes may be crystalline or non-crystalline.

In embodiments, the wax may be incorporated into the toner in the form of one or more aqueous emulsions or dispersions of solid wax in water, where the solid wax particle size may be in the range of from about 100 nanometers (nm) to about 500 nm.

Optionally, the toner process further comprises coalescing the aggregated toner particles.

In embodiments, the toner process further comprises wherein the aggregated toner particles form a core, and further comprise, during aggregation, adding additional emulsion to form a shell over the core. In certain embodiments, the additional emulsion forming the shell is the same material as the emulsion forming the core. In other embodiments, the additional emulsion forming the shell can be different from the material forming the toner core. In embodiments, the process comprises adding a second resin to the aggregated toner particles to form a shell over the aggregated toner particles thereby forming a core-shell toner; adding the coalescing agent to the toner particles, and subsequently heating the core-shell toner with the coalescing agent at a temperature above the glass transition temperature of the second resin.

In other embodiments, the toner herein can be formed by a process comprising homogenizing the resin emulsion with a surfactant, the colorant having the reactive component disposed thereon, an optional wax, and an optional coagulant to form a homogenized toner slurry comprising pre-aggregated particles at room temperature; heating the slurry to form aggregated toner particles; optionally freezing the toner slurry once at the desired aggregated particle size; and further heating the aggregated particles in the slurry to coalesce the aggregated particles into toner particles.

Heating to form aggregated toner particles may be to any suitable or desired temperature for any suitable or desired time. In embodiments heating to form aggregated toner particles may be to a temperature below the Tg of the latex, in embodiments to from about 30° C. to about 70° C. or to about 40° C. to about 65° C., for a period of time from about 0.2 hour to about 6 hours, or from about 0.3 hour to about 5 hours, in embodiments, resulting in toner aggregates of from about 3 microns to about 15 microns in volume average diameter, or in embodiments of from about 4 microns to about 8 microns in volume average diameter, although not limited.

Freezing the toner slurry to stop particle growth once the desired aggregated particle size is achieved can be by any suitable or desired method. In embodiments, the mixture is cooled in a cooling or freezing step. In embodiments, the mixture is pH adjusted, such as by freezing the aggregation of the particles with a buffer solution having a pH of about 7 to about 12, over a period of from about 1 minute to about 1 hour, or to about 8 hours or from about 2 minutes to about 30 minutes. In embodiments, cooling a coalesced toner slurry includes quenching by adding a cooling medium such as, for example, ice, dry ice and the like, to effect rapid cooling to a temperature of from about 20° C. to about 40° C. or from about 22° C. to about 30° C.

Coalescing the aggregated particles into toner particles can be by any suitable or desired method. In embodiments, coalescing comprises further heating the aggregated particles in the slurry to coalesce the aggregated particles into toner particles. In embodiments, the aggregate suspension may be heated to a temperature at or above the Tg of the latex. Where the particles have a core-shell configuration, heating may be above the Tg of the first latex used to form the core and the Tg of the second latex used to form the shell, to fuse the shell latex with the core latex. In embodiments, the aggregate suspension may be heated to a temperature of from about 80° C. to about 120° C. or from about 85° C. to about 98° C., for a period of time from about 1 hour to about 6 hours or from about 2 hours to about 4 hours.

The toner slurry may then be washed. In embodiments, washing may be carried out at a pH of from about 7 to about 12 or from about 9 to about 11 and the washing may be at a temperature of from about 30° C. to about 70° C. or from about 40° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry is adjusted with an acid, and followed optionally by one or more deionized water washes.

In embodiments, drying may be carried out at a temperature of from about 35° C. to about 85° C. or from about 45° C. to about 60° C. The drying may be continued until the moisture level of the particles is below a set target of about 1% by weight, in embodiments of less than about 0.7% by weight.

In some embodiments a pH adjustment agent may be added to control the rate of the emulsion aggregation process. The pH adjustment agent utilized in the processes of the present disclosure can be any acid or base that does not adversely affect the products being produced. Suitable bases can include metal hydroxides, such as sodium hydroxide, potassium hydroxide, ammonium hydroxide, and optionally combinations thereof. Suitable acids include nitric acid, sulfuric acid, hydrochloric acid, citric acid, acetic acid, and optionally combinations thereof.

Colorant, wax, colorant wax dispersions, or pigmented wax dispersions, may be added during formation of the latex polymer in the emulsion aggregation synthesis. Suitable waxes include, for example, submicron wax particles in the size range of from about 50 to about 1000 nanometers, in embodiments of from about 100 to about 500 nanometers in volume average diameter, suspended in an aqueous phase of water and an ionic surfactant, nonionic surfactant, or combinations thereof. Suitable surfactants include those described above. The ionic surfactant or nonionic surfactant may be present in an amount of from about 0.1 to about 20 percent by weight, and in embodiments of from about 0.5 to about 15 percent by weight of the wax.

The wax or colorant wax dispersion according to embodiments of the present disclosure may include, for example, a natural vegetable wax, natural animal wax, mineral wax, and/or synthetic wax. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes of the present disclosure include, for example, Fischer-Tropsch wax, acrylate wax, fatty acid amide wax, silicone wax, polytetrafluoroethylene wax, polyethylene wax, polypropylene wax, and combinations thereof.

Examples of polypropylene and polyethylene waxes include those commercially available from Allied Chemical and Baker Petrolite, wax emulsions available from Michelman Inc. and the Daniels Products Company, EPOLENE® N-15 commercially available from Eastman Chemical Products, Inc., VISCOL® 550-P, a low weight average molecular weight polypropylene available from Sanyo Kasel K.K., and similar materials. In embodiments, commercially available polyethylene waxes possess a molecular weight (Mw) of from about 100 to about 5000, and in embodiments of from about 250 to about 2500, while the commercially available polypropylene waxes have a molecular weight of from about 200 to about 10,000, and in embodiments of from about 400 to about 5000.

In embodiments, the waxes may be functionalized. Examples of groups added to functionalize waxes include amines, amides, imides, esters, quaternary amines, and/or carboxylic acids. In embodiments, the functionalized waxes may be acrylic polymer emulsions, for example, JONCRYL® 74, 89, 130, 537, and 538, all available from Johnson Diversey, Inc, or chlorinated polypropylenes and polyethylenes commercially available from Allied Chemical, Baker Petrolite Corporation and Johnson Diversey, Inc.

The colorant may be a pigment, a dye, a dispersion thereof, or a combination thereof. Pigmented wax dispersions can contain any suitable or desired pigment colorant. In specific embodiments, the colorant is a pigment. In a specific embodiment, the colorant is a pigment selected from the group consisting of a magenta pigment, a cyan pigment, a yellow pigment, a black pigment, and mixtures and combinations thereof. The pigmented wax dispersions may be stabilized by synergists and dispersants.

Examples of suitable pigments include PALIOGEN® Violet 5100 (BASF); PALIOGEN® Violet 5890 (BASF); HELIOGEN® Green L8730 (BASF); LITHOL® Scarlet D3700 (BASF); SUNFAST® Blue 15:4 (Sun Chemical); Hostaperm® Blue B2G-D (Clariant); Hostaperm® Blue B4G (Clariant); SPECTRA® PAC C Blue 15:4 (Sun Chemical); Permanent Red P-F7RK; Hostaperm® Violet BL (Clariant); LITHOL® Scarlet 4440 (BASF); Bon Red C (Dominion Color Company); ORACET® Pink RF (BASF); PALIOGEN® Red 3871 K (BASF); SUNFAST® Blue 15:3 (Sun Chemical); PALIOGEN® Red 3340 (BASF); SUNFAST® Carbazole Violet 23 (Sun Chemical); LITHOL®

Fast Scarlet L4300 (BASF); SUNBRITE® Yellow 17 (Sun Chemical); HELIOGEN® Blue L6900, L7020 (BASF); SUNBRITE® Yellow 74 (Sun Chemical); SPECTRA® PAC C Orange 16 (Sun Chemical); HELIOGEN® Blue K6902, K6910 (BASF); SUNFAST® Magenta 122 (Sun Chemical); HELIOGEN® Blue D6840, D7080 (BASF); Sudan Blue OS (BASF); NEOPEN® Blue FF4012 (BASF); PV Fast Blue B2GO1 (Clariant); IRGALITE® Blue GLO (BASF); PALIOGEN® Blue 6470 (BASF); Sudan Orange G (Aldrich); Sudan Orange 220 (BASF); PALIOGEN® Orange 3040 (BASF); PALIOGEN® Yellow 152, 1560 (BASF); LITHOL® Fast Yellow 0991 K (BASF); PALIOTOL® Yellow 1840 (BASF); NOVOPERM® Yellow FGL (Clariant); Ink Jet Yellow 4G VP2532 (Clariant); Toner Yellow HG (Clariant); Lumogen® Yellow D0790 (BASF); Suco-Yellow L1250 (BASF); Suco-Yellow D1355 (BASF); Suco Fast Yellow D1355, D1351 (BASF); HOSTAPERM® Pink E 02 (Clariant); Hansa Brilliant Yellow 5GX03 (Clariant); Permanent Yellow GRL 02 (Clariant); Permanent Rubine L6B 05 (Clariant); FANAL® Pink D4830 (BASF); CINQUASIA® Magenta (DU PONT); PALIOGEN® Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Wax, colorant wax dispersions, or pigmented wax dispersions, can contain any suitable or desired wax. The wax will be selected in accordance with the desired end product.

In embodiments, the wax is selected from the group consisting of polyolefins, carnauba wax, rice wax, candelilla wax, sumacs wax, jojoba oil, beeswax, montan wax, ozokerite, ceresin, paraffin wax, microcrystalline wax, Fischer-Tropsch wax, stearyl stearate, behenyl behenate, butyl stearate, propyl oleate, glyceride monostearate, glyceride distearate, pentaerythritol tetra behenate, diethyleneglycol monostearate, dipropyleneglycol distearate, diglyceryl distearate, triglyceryl tetrastearate, sorbitan monostearate, polyethylene wax, ester wax, amide wax, fatty acids, fatty alcohols, fatty amides, and combinations thereof.

When used in a toner, the colorant and wax may be included in the toner any suitable or desired amount, in embodiments, the colorant may be included in the toner in an amount of from about 0.1 to about 35 percent by weight of the toner, or from about 1 to about 25 weight percent of the toner, or from about 2 to about 15 percent by weight of the toner.

Developer compositions can be prepared by mixing the toners obtained with the processes disclosed herein with known carrier particles, including coated carriers, such as steel, ferrites, and the like. Such carriers include those disclosed in U.S. Pat. Nos. 4,937,166 and 4,935,326, the entire disclosures of each of which are incorporated herein by reference. The carriers may be present from about 2 percent by weight of the toner to about 8 percent by weight of the toner, in embodiments from about 4 percent by weight to about 6 percent by weight of the toner. The carrier particles can also include a core with a polymer coating there over, such as polymethylmethacrylate (PMMA), having dispersed therein a conductive component like conductive carbon black. Carrier coatings include silicone resins such as methyl silsesquioxanes, fluoropolymers such as polyvinylidene fluoride, mixtures of resins not in close proximity in the tribo electric series such as polyvinylidene fluoride and acrylics, thermosetting resins such as acrylics, combinations thereof and other known components.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Figure 2:
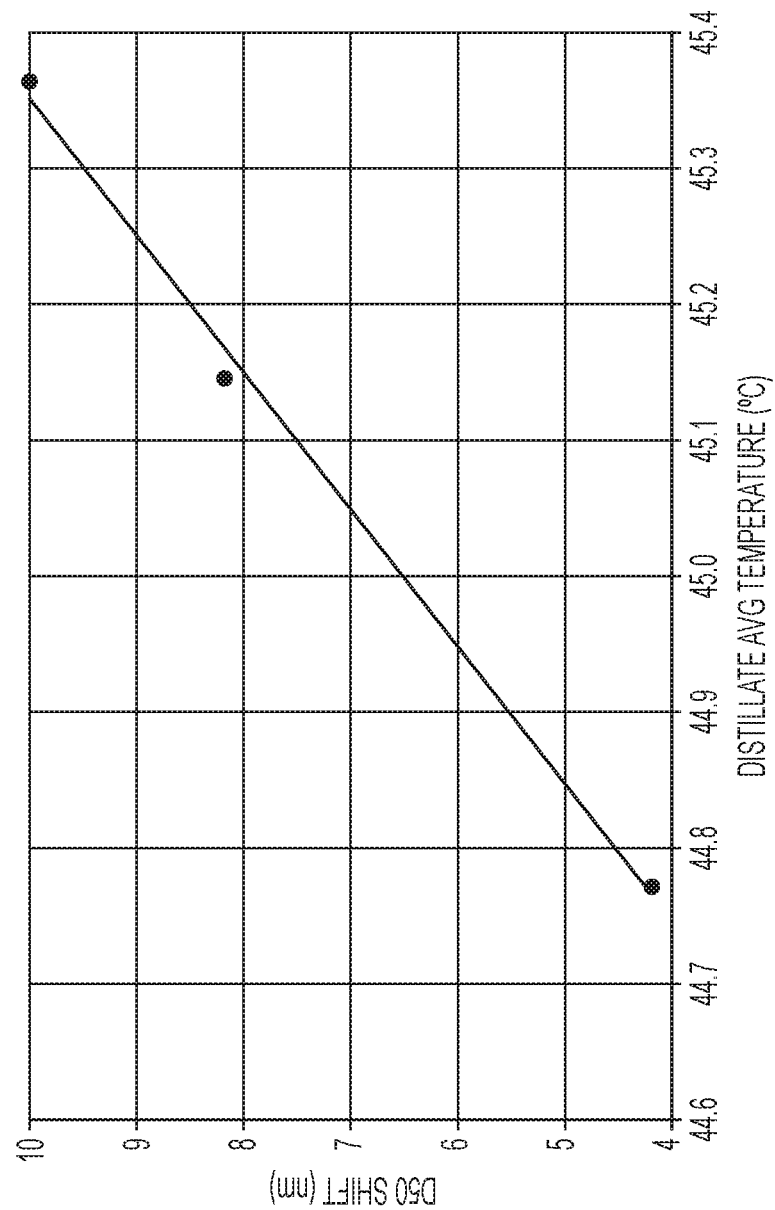
FIG. 2 is a scatter plot showing distillate average temperature (° C., x-axis) versus D50 shift (nanometers, y-axis).

Three experiments were run to establish the correlation between the D50 of the particle size distribution and the distillate temperature. Each run used the PIE process to create resin latex from poly(co-propoxylated bisphenol co-ethoxylated bisphenol co-terephthalate), amorphous resin. Each run used the PIE process with slightly different formulation (about 10% concentration change in IPA) and raw materials (different resin lots) to produce resin latex from poly(co-propoxylated bisphenol co-ethoxylated bisphenol co-terephthalate) resin. Different formulations and resin lots were used to verify this correlation. The particle size distribution was measured before and after the vacuum distillation using the Nanotrac™ 252 (Microtrac, Montgomeryville, Pa., USA) particle size analyzer. The change in the D50 given was then compared to the average temperature of the distillate using Quantum Excel, shown in FIG. 2. Since the p-Value is less than 0.05 the null hypothesis that the data set is non-linear is rejected.

Example 1

12 kilograms of poly(co-propoxylated bisphenol co-ethoxylated bisphenol co-terephthalate) amorphous resin, 7.2 kilograms of methyl ethyl ketone, 2.2 kilograms of isopropyl alcohol, 350 grams of ammonia hydroxide, and 7.5 kilograms of water was charged into a 20 gallon reactor equipped with a jacket, a vacuum, a condenser connected to the reactor by a distillate conduit, and a receiver connected to the condenser by a condensate conduit, and mixed at a speed of 75 RPM to form a water-in-oil dispersion mixture. 16.5 kilograms of water was added to the water-in-oil dispersion mixture over a 1 hour time period, mixing at 100 RPM, while the jacket was set to 42° C. to convert the water-in-oil dispersion mixture into an oil-in-water dispersion comprising a latex emulsion of latex particles. A sample was taken to measure the particle size distribution of the latex before the removal of the volatile organic compounds. A distillate was formed by adjusting the jacket temperature to about 56° C., and by applying a vacuum to the system with a vacuum level range from 15 to 25 inHg (inches of mercury). Volatile organic compounds were pulled out of the liquid phase in the reactor to a vapor phase and transferred to the condenser via the distillate conduit, the temperature of the vapor was measured and recorded. The distillate vapor in the condenser was cooled to about 10° C. to a liquid phase; and the liquid condensate was collected in the receiver. After the volatiles had been removed, the solids content was adjusted by adding water. A final sample was then taken to measure the particle size distribution.

Example 2

12 kilograms of poly(co-propoxylated bisphenol co-ethoxylated bisphenol co-terephthalate) amorphous resin, 7.2 kilograms of methyl ethyl ketone, 1.8 kilograms of isopropyl alcohol, 350 grams of ammonia hydroxide, and 7.5 kilograms of water was charged into a 20 gallon reactor equipped with a jacket, a vacuum, a condenser connected to the reactor by a distillate conduit, and a receiver connected to the condenser by a condensate conduit, and mixed at a speed of 75 RPM to form a water-in-oil dispersion mixture. 16.5 kilograms of water was added to the water-in-oil dispersion mixture over a 1 hour time period, mixing at 100 RPM, while the jacket was set to 42° C. to convert the water-in-oil dispersion mixture into an oil-in-water dispersion comprising a latex emulsion of latex particles. A sample was taken to measure the particle size distribution of the latex before the removal of the volatile organic compounds. A distillate was formed by adjusting the jacket temperature to about 56° C., and by applying a vacuum to the system with a vacuum level range from 15 to 25 inHg. Volatile organic compounds were pulled out of the liquid phase in the reactor to a vapor phase and transferred to the condenser via the distillate conduit, the temperature of the vapor was measured and recorded. The distillate vapor in the condenser was cooled to about 10° C. to a liquid phase; and the liquid condensate was collected in the receiver. After the volatiles had been removed, the solids content was adjusted by adding water. A final sample was then taken to measure the particle size distribution.

Example 3

Example 3 repeated Example 1 except with the use of a different poly(co-propoxylated bisphenol co-ethoxylated bisphenol co-terephthalate) amorphous resin lot.

The data for the three latex vacuum distillation experiments of Examples 1-3 is listed in Table 1. Table 1 illustrates that D50 shifts as a function of distillate average temperature. The distillate temperature was recorded every second during the vacuum distillation and then averaged for comparison. The particle size distribution was measured using the Microtrac Nanotrac™ 252 before and after the distillation and the D50 shift was calculated. The plot generated from Quantum XL (FIG. 2) shows that there is a strong correlation between the degree of the size shift and distillate temperature—that is, the change in particle size is proportional to the temperature of the distillate. By adjusting the shrinking degree of the particle size, the final particle size distribution of the resin latex can be optimized during stripping. Table 2 shows particle size (in nanometers) before and after solvent removal for Examples 1-3.

TABLE 1

| Example | Distillate Average Temperature (° C.) | D50 Shift (nanometers) |
| --- | --- | --- |
| 1 | 45.1 | 8.2 |
| 2 | 44.8 | 4.2 |
| 3 | 45.4 | 10.0 |

TABLE 2

|  | Example 1 | Example 2 | Example 3 |
| --- | --- | --- | --- |
| Before Solvent Removal (nanometers) |  |  |  |
| D10 | 154.2 | 159.8 | 137.6 |
| D50 | 214.5 | 223.2 | 196.8 |
| D95 | 338 | 366 | 311 |
| After Solvent Removal (nanometers) |  |  |  |
| D10 | 150.4 | 159.4 | 137.7 |
| D50 | 206.3 | 219 | 186.8 |
| D95 | 321 | 324 | 302 |

Thus, a method is provided to control particle size during solvent stripping. Beyond size control through formulation adjustment, the present method enables adjustment of the particle size distribution during the solvent stripping process as needed or desired. Thus, a second tuning knob for particle size control after formulation adjustment is provided. The method can be applied to any solvent stripping process for polyester latex production.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase inversion emulsification process for controlling latex particle size comprising:
    a) combining a resin, an organic solvent, an optional neutralizing agent, and a first portion of water in a reactor;
    wherein said reactor is equipped with a jacket, a vacuum, a condenser connected to the reactor by a distillate conduit, and a receiver connected to the condenser by a condensate conduit, to form a water-in-oil dispersion mixture;
    b) adding a second portion of water to the reactor to convert the water-in-oil dispersion mixture into an oil-in-water dispersion comprising a latex emulsion of latex particles;
    c) forming a distillate and controlling the distillate temperature by at least one of: adjusting the jacket temperature, adjusting the vacuum level, or a combination thereof;
    wherein controlling the distillate temperature controls a particle size distribution change of the latex particles during solvent removal;
    wherein the distillate temperature is from about 30 to about 80° C.;
    d) performing solvent removal wherein volatile organic compounds are pulled out of the liquid phase in the reactor to a vapor phase and transferred to the condenser via the distillate conduit;
    e) cooling distillate vapor in the condenser to a liquid phase; and
    f) collecting the liquid condensate in the receiver.

2. The process of claim 1, further comprising:
    measuring the distillate temperature in the distillate conduit and adjusting at least one of: the jacket temperature, the vacuum level, or a combination thereof, to control the temperature of the distillate;
    wherein the distillate temperature is from about 40 to about 60° C.

3. The process of claim 1, wherein the particle size distribution of latex particles in the latex emulsion comprises a D50 of from about 50 to about 500 nanometers, a D10 of from about 3 to about 300 nanometers, and a D95 of from about 150 to about 750 nanometers.

4. The process of claim 1, wherein the particle size distribution of latex particles in the latex emulsion comprises a D50 of from about 150 to about 300 nanometers, a D10 of from about 50 to about 175 nanometers, and a D95 of from about 200 to about 500 nanometers.

5. The process of claim 1, wherein the resin is an amorphous polyester, a crystalline polyester, or a mixture thereof.

6. The process of claim 1, wherein the resin comprises poly(co-propoxylated bisphenol co-ethoxylated bisphenol co-terephthalate).

7. The process of claim 1, wherein the organic solvent is selected from the group consisting of methanol, ethanol, isopropanol, butanol, ethylene glycol, glycerol, sorbitol, acetone, 2-butanone, 2-pentanone, 3-pentanone, ethyl isopropyl ketone, methyl isobutyl ketone, diisobutyl ketone, methyl ethyl ketone, dimethylformamide, dimethylacetamide, N-meth-ylpyrrolidone, 1,2-dimethyl-2-imidazolidinone, acetonitrile, propionitrile, butyronitrile, isobutyronitrile, valeronitrile, benzonitrile, ditertbutyl ether, dimethoxyethane, 2-methoxy-ethyl ether, 1,4-dioxane, tetrahydrohyran, morpholine, methylsulfonylmethane, sulfolane, dimethylsulfoxide, hexamethylphosphoramide, benzenes, esters, amines, and combinations thereof.

8. The process of claim 1, wherein the organic solvent comprises a combination of at least two organic solvents.

9. A latex emulsion prepared with the process of claim 1.

10. A toner process comprising:
a) combining a first resin, an organic solvent, an optional neutralizing agent, and a first portion of water in a reactor;
wherein said reactor is equipped with a jacket, a vacuum, a condenser connected to the reactor by a distillate conduit, and a receiver connected to the condenser by a condensate conduit, to form a water-in-oil dispersion mixture;
b) adding a second portion of water to the reactor to convert the water-in-oil dispersion mixture into an oil-in-water dispersion comprising a latex emulsion of latex particles;
c) forming a distillate and controlling the distillate temperature by at least one of: adjusting the jacket temperature, adjusting the vacuum level, or a combination thereof;
wherein controlling the distillate temperature controls a particle size distribution change of the latex particles during solvent removal;
wherein the distillate temperature is from about 30 to about 80° C.;
d) wherein volatile organic compounds are pulled out of the liquid phase in the reactor to a vapor phase and transferred to the condenser via the distillate conduit;
e) cooling distillate vapor in the condenser to a liquid phase;
f) collecting the liquid condensate in the receiver;
g) optionally, adding a second resin to the latex emulsion obtained in step b);
h) optionally, adding a crystalline resin to the latex emulsion obtained in step b);
i) optionally, adding a wax, a colorant, or a combination thereof to the latex emulsion obtained in step b);
j) optionally, adding a flocculent to the late emulsion obtained in step b);
k) aggregating particles in said latex emulsion;
l) freezing particle growth in said emulsion to form parent particles;

m) optionally, adding a shell resin to form core-shell particles;
o) optionally, coalescing the parent particles or the core-shell particles to form toner particles; and
p) optionally, collecting the parent particles of l), the core-shell particles of m) or the toner particles of o).

11. The toner process of claim 10, further comprising:
measuring the distillate temperature in the distillate conduit and adjusting at least one of: the jacket temperature, the vacuum level, or a combination thereof, to control the temperature of the distillate;
wherein the distillate temperature is from about 40 to about 60° C.

12. The toner process of claim 10, wherein the particle size distribution of latex particles in the latex emulsion comprises a D50 of from about 50 to about 500 nanometers, a D10 of from about 3 to about 300 nanometers, and a D95 of from about 150 to about 750 nanometers.

13. The toner process of claim 10, wherein the particle size distribution of latex particles in the latex emulsion comprises a D50 of from about 150 to about 300 nanometers, a D10 of from about 50 to about 175 nanometers, and a D95 of from about 200 to about 500 nanometers.

14. The toner process of claim 10, wherein the resin is an amorphous polyester, a crystalline polyester, or a mixture thereof.

15. The toner process of claim 10, wherein the first resin comprises poly(co-propoxylated bisphenol co-ethoxylated bisphenol co-terephthalate).

16. The toner process of claim 10, wherein the organic solvent is selected from the group consisting of methanol, ethanol, isopropanol, butanol, ethylene glycol, glycerol, sorbitol, acetone, 2-butanone, 2-pentanone, 3-pentanone, ethyl isopropyl ketone, methyl isobutyl ketone, diisobutyl ketone, methyl ethyl ketone, dimethylformamide, dimethylacetamide, N-meth-ylpyrrolidone, 1,2-dimethyl-2-imidazolidinone, acetonitrile, propionitrile, butyronitrile, isobutyronitrile, valeronitrile, benzonitrile, ditertbutyl ether, dimethoxyethane, 2-methoxy-ethyl ether, 1,4-dioxane, tetrahydrohyran, morpholine, methylsulfonylmethane, sulfolane, dimethylsulfoxide, hexameth ylphosphoramide, benzenes, esters, amines, and combinations thereof.

17. The toner process of claim 10, wherein the organic solvent comprises a combination of at least two organic solvents.

18. The toner process of claim 10, wherein the wax is selected from the group consisting of polyolefins, carnauba wax, rice wax, candelilla wax, sumacs wax, jojoba oil, beeswax, montan wax, ozokerite, ceresin, paraffin wax, microcrystalline wax, Fischer-Tropsch wax, stearyl stearate, behenyl behenate, butyl stearate, propyl oleate, glyceride monostearate, glyceride distearate, pentaerythritol tetra behenate, diethyleneglycol monostearate, dipropyleneglycol distearate, diglyceryl distearate, triglyceryl tetrastearate, sorbitan monostearate, polyethylene wax, ester wax, amide wax, fatty acids, fatty alcohols, fatty amides, and combinations thereof.

19. The toner process of claim 10, wherein the colorant is a pigment, a dye, or a combination thereof.

20. A toner prepared by the process of claim 10.

* * * * *